United States Patent [19]

Albertson

[11] Patent Number: 4,529,079
[45] Date of Patent: Jul. 16, 1985

[54] CUSHION-BONDED DRIVEN DISC ASSEMBLY AND METHOD OF CONSTRUCTION

[75] Inventor: Clarence E. Albertson, Villa Park, Ill.

[73] Assignee: Borg-Warner Corporation, Chicago, Ill.

[21] Appl. No.: 339,815

[22] Filed: Jan. 15, 1982

Related U.S. Application Data

[63] Continuation-in-part of Ser. No. 112,674, Jan. 16, 1980, abandoned.

[51] Int. Cl.³ .............................................. F16D 69/04
[52] U.S. Cl. ................................. 192/107 C; 156/291; 192/107 R
[58] Field of Search .......... 192/107 M, 107 R, 107 C; 156/291

[56] References Cited

U.S. PATENT DOCUMENTS

| 1,862,991 | 6/1932 | Vargha | 192/107 C |
| 1,956,828 | 5/1934 | Fink | 192/107 C |
| 2,059,576 | 11/1936 | Glick | 192/107 |
| 2,253,316 | 8/1941 | Armitage | 192/107 R |
| 2,554,548 | 5/1951 | Albagnac | 188/251 |
| 2,907,430 | 10/1959 | Grote | 192/107 R |
| 3,037,860 | 6/1962 | Masterson et al. | 75/208 |
| 3,231,058 | 1/1966 | Batchelor et al. | 192/107 R |
| 3,655,482 | 4/1972 | Schildkraut | 156/276 |
| 3,806,391 | 4/1974 | Clay et al. | 156/279 |
| 3,808,088 | 4/1974 | Knechtges et al. | 161/148 |
| 3,841,949 | 10/1974 | Black | 161/42 |
| 4,289,554 | 9/1981 | Reicherts et al. | 156/291 |

FOREIGN PATENT DOCUMENTS

| 2709167 | 9/1978 | Fed. Rep. of Germany | 156/291 |
| 2822729 | 12/1978 | Fed. Rep. of Germany | 192/107 C |

OTHER PUBLICATIONS

Peterson's, "Basic Clutches & Transmissions", 3rd Edition, pp. 10-21, (no date provided).

*Primary Examiner*—Rodney H. Bonck
*Attorney, Agent, or Firm*—Florian S. Gregorczyk

[57] ABSTRACT

A wearing dry friction material element is mounted on a support member by a cured rubber adhesive in a spaced pattern. The cured adhesive has a tensile strength adequate to retain the frictional element to the substrate, and also serves to cushion the shock at engagement between the frictional element and a contacting surface. The cured adhesive is generally of the room temperature vulcanizing (RTV) rubber type. Also described is a method for the production of a dry friction material assembly.

7 Claims, 8 Drawing Figures

CUSHION-BONDED DRIVEN DISC ASSEMBLY AND METHOD OF CONSTRUCTION

This application is a continuation-in-part of application Ser. No. 112,674 filed Jan. 16, 1980, and now abandoned.

BACKGROUND OF THE INVENTION

In the manufacture of clutches and brakes, various techniques and fasteners have been utilized to assemble dry friction materials to support members. For example, welds, rivets, bolts and adhesives have been employed. In addition, ceramic filled compacts have been sintered, coined for density and size, and formed on a binder base by rivets, welds or with adhesives. Another assembly technique requires the forming of studs on the friction material as mating members for holes in the support member, and thereafter securing the friction material with adhesive to the supporting member.

A vehicle generally includes a clutch in the drive train, connected between the internal combustion engine and the drive wheel(s). Because an internal combustion engine has a relatively narrow speed range over which it is most efficient, a transmission with three or four different gear ratios is employed to maintain engine operation within the most effective speed range. Changes between these gear ratios are made with a clutch, preferably one able to transmit maximum torque without loss of power due to slippage. At the moment of clutch engagement, the impact must be absorbed and torque must be transmitted to the drive-train in a gradual and uniform manner, or the resulting shock could cause damage to the clutch or drive-train members.

The shock-absorption of a clutch at engagement has been accomplished with various lining constructions. There are certain advantages of a lining riveted to cushion springs such as good shock absorption, but at higher engine rpm ranges, that is about 7500 to 8000 rpm, a riveted lining disc may break due to centrifugal force, at the rivet heads. On the other hand, a lining material adhesively bonded to the clutch disc has no compressibility, but it provides an increased contact area and is much less likely to "chunk off" or burst at higher rpm ranges. It would be desirable to obtain the burst strength resistance characteristic of the bonded lining, and add the shock-absorbing characteristic of linings riveted to cushion springs. This can be done by bonding a lining to a metal disc for strength and riveting the metal disc to cushion springs, but this requires added manufacturing steps. In addition, elimination of the rivet as a joining technique has been sought, and adhesives have been employed for such joining.

One bonding method for assembling a friction material on a clutch disc provides an assembly with the two elements joined in a laminate structure, bonded under pressure with an adhesive material of unknown or presumed thickness. Generally when utilizing a bonding material the adhesive thickness is on the order of 0.005 inches or less and it is a continuous film with no appreciable compressibility in the adhesive layer. This bonding technique does not allow for the adhesive thickness to be uniform. Nor does it maximize the adhesive usage, as some adhesive is squeezed out during the compression of the laminated structure. The tensile strength of a cured adhesive often is dependent upon its thickness, and generally there is a preferred range of optimal thickness for a given adhesive. This optimal thickness may depend upon the texture of the surfaces being joined, that is, a rough, irregular surface will generally cause more variations in adhesive thickness than will a smooth, regularly spaced or textured surface. Thus, in the case of the two smooth surfaces, a quantity of the adhesive may be squeezed from between the surfaces, resulting in less than the required range of optimal thickness for maximum tensile strength. In the case of the irregular surface or surfaces, the separating distance between laminate surfaces will be suspect, as will the tensile strength of the adhesive bond.

The problem of attaining the optimal thickness range when utilizing adhesive has been attacked on several fronts. One effort involved the controlled spraying of a substrate with a latex adhesive of a nominally fixed viscosity to produce individual droplets as raised, spaced deposits. This required a control of the spray process, including the droplet velocity and the adhesive viscosity. An alternative to this involves the rolling of an adhesive, that is, a transfer roll method. However, this requires a specially textured roll. In the past the rolling technique has led to a uniform but continuous layer which does not resolve the problem of the material being squeezed from between two laminating surfaces. As a result of this squeezing process, there may be a lack of uniformity in the thickness of the bonding agent and a consequent loss of tensile strength. A technique utilizing incompressible beads of known diameter intermixed with the adhesive insured a fixed gap size between two hard, smooth surfaces. The hard incompressible material is not desirable in clutch applications where a certain flexibility is desired.

In the particular case of clutch plates and brake shoes, a technique of sintering preformed ceramic filled compact materials, coining these sintered preforms for sizing tolerances, and welding the coined product to backing plates has been utilized to produce clutches and brake shoes. This rather complex and time consuming procedure produces a friction material that can wear down to the bonding medium with no concern for rivets, and thereby attain the full utilization of the friction material before replacement. Although such a method attains nominal improvements in impact strength and shearing forces, it does so by increasing the processing steps and manufacturing time.

There have been other techniques developed to bond friction type material, including the use of heating or drying ovens to cure adhesive type materials. Any technique that bonds the clutch facing to the driven disc must provide the compression and shear strength to withstand clutch engagement.

An important object of the invention is to obviate the use of rivets, shock-absorbing springs, bonded metal reinforcing backing discs, and the pitched wafers for mounting friction material in a clutch assembly while retaining the desirable effects of these devices.

Another object of the invention is to maximize the use of adhesive material in attaining the desired physical parameters for any individually specified application.

SUMMARY OF THE INVENTION

The present invention provides a wearing dry friction material assembly. A dry friction material is resiliently mounted to a substrate support member by regularly spaced quantities of a resilient adhesive composition to support the friction facing. The adhesive composition contacts and bridges the opposed surfaces of the dry friction material and substrate support member. The distance between the dry friction material and the support member, in a preferred embodiment, is adjusted to correlate the adhesive quantity, tensile strength and modulus of the cured rubber adhesive areas or elements to obtain the desired amount of compression under clutch engagement loads. The cured adhesive bridges serve as springlike cusions to absorb and dampen the shock loading at clutch engagement.

THE DRAWING

The invention will now be described in detail by way of example with reference to the following drawing, in which FIG. 1 is a plan view of an annular clutch facing showing the obverse face with three different adhesive bead patterns;

DETAILED DESCRIPTION OF THE INVENTION

Figure 1:
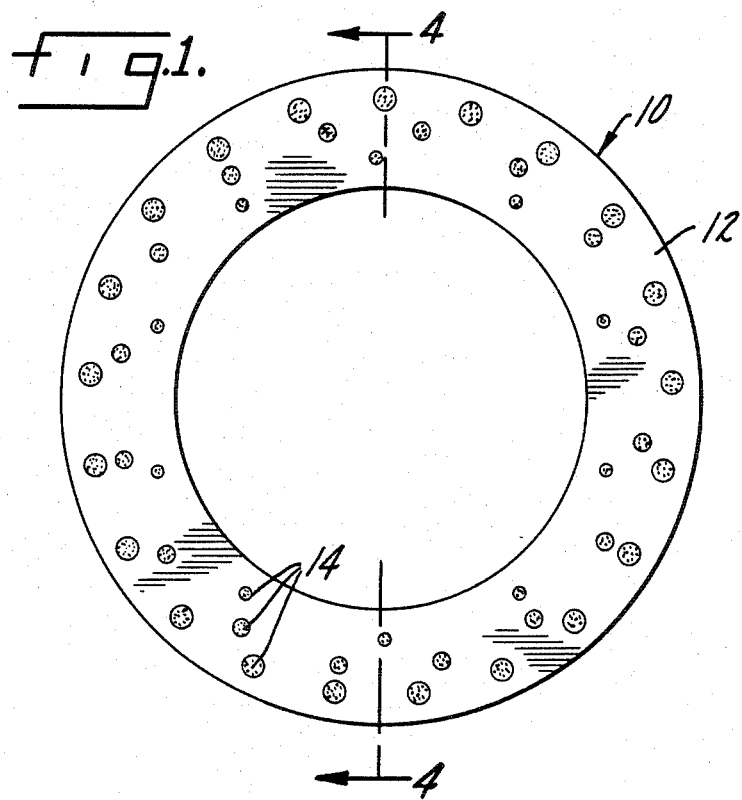
Figure 4:
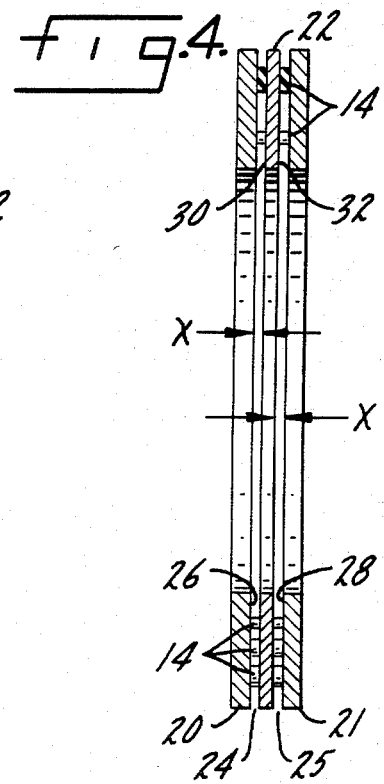
FIG. 4 is a cross-sectional view of two friction material linings or elements mounted on a substrate driven clutch disc and indicating the bead with the separated distance.
Figure 2:
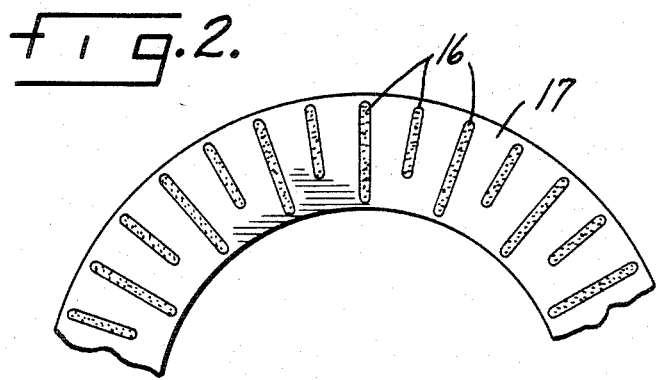
FIGS. 2 and 3 are segments of an annular clutch facing with alternate adhesive bead patterns.
Figure 3:
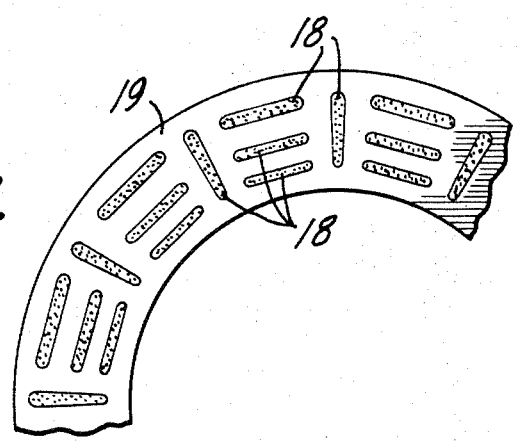

Referring first to FIG. 1, a substrate support member 10 of a wearing dry friction material assembly, as shown in sideview in FIG. 4, has an annular surface 12 on which a multiplicity of rubber adhesive beads 14, that can be room temperature vulcanizing rubber (RTV) adhesive, are arranged in a pattern as shown. FIGS. 2 and 3 illustrate other bead arrays or patterns 16 and 18, respectively, disposed on annular surfaces 17 and 19, respectively. These patterns are merely illustrative of patterns which could be extruded onto the annular surface while maintaining large open areas between individual adhesive areas. Thus, the individual adhesive beads have adequate room to spread when contacted with mating surface (not shown), thus avoiding a continuous intersurface layer of adhesive. Relatively narrow beads are extruded to control the final shape and thus the shape factor of the cured rubber cushion-bond element.

Figure 5:
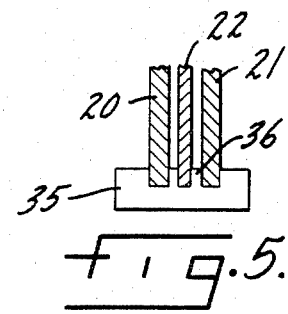
FIG. 5 is a sectional side view of a fixture for mounting the friction material lining and a substrate.

FIG. 4 indicates in cross-section two friction material linings or elements 20 and 21 mounted on either face of a substrate support member 22 with bridging adhesive areas 24, 25 contacting linings 20, 21 at friction material faces 26 and 28, and contacting substrate 22 at substrate faces 30 and 32, respectively, by a fixed distance "x" which is attained by mounting the assembly in an appropriate fixture, or with shims between the surface pairs 26, 30 and 28, 32. A fixture such as spacer support 35, shown in FIG. 5, with dividing teeth 36 can be used to secure the precise distance "x". The given thickness of each tooth 36 in effect sets the distance "x". The distance "x" is determined by noting the maximum compression under the engagement load which indicates the cushion capability of the adhesive, thus indicating the required adhesive quantity based upon its modulus of elasticity after curing. In this way the distance "x" is a function of the shear and compressibility characteristics of the adhesive material.

The paste or gel like rubber adhesive is applied to either the driven disc or the lining. The parts are then assembled to the desired "x" distance and the adhesive is cured. No specific formulation of rubber adhesive is prerequisite to the practice of this invention, but the formulation must be of such consistency as not to readily flow. Any of the commercially available brands with adequate physical properties is suitable. The spacing of the adhesive beads and the quantity of adhesive extruded between the lining and substrate can be adjusted by proper design of fixture 35 to compensate for the various RTV or rubber adhesives, to thereby maximize tensile strength while producing the requisite shock absorbing or cushion characteristic. In addition, the spaced paste or gel like rubber adhesive areas 14 do not coalesce to form a continuous film between the friction element and the substrate support member. These spaces between the bridged adhesive areas or elements allow for air cooling, and for compression under engaging loads.

The adhesive bead patterns are to uniformly support the lining material, that is to maintain uniform load from the inside diameter to the outside diameter of the lining and thereby prevent uneven wear of the lining. The adhesive patterns provide a cushion for smoother clutch engagement while having the shear strength to withstand the torque of the clutch in a vehicle.

The strength and compression levels of three test adhesives were evaluated and the test results are provided below. These adhesives are General Electric Company's GE 1473 and GE 159, and Dow Corning Corporation DC 7057 labeled respectively specimens 1, 2 and 3. Tensile tests were performed on overlapped rolled steel sheets which had been cleaned and then bonded with three, one-eighth inch, beads of adhesive two inches (2") long, and three quarters inch ($\frac{3}{4}$") apart. The separation between steel sheets was 0.041 inches. The specimens were cured for one week at room temperature.

The specimens were tensile tested at room temperature (RT) and 500° F. Adhesive deflection or stretch at break was recorded, and compression at room temperature under loads of 30, 60 and 90 pounds was measured. The results of these are shown in Table I, which lists tensile strength, tensile elongation at break, average compression and the percentage of the type of adhesive failure. The percentage failure reported shows the percentage of the bonded area which failed in one way or the other. The cohesive failure implies a fracture within the RTV adhesive and adhesive failure refers to the adhesive which peeled from the metal surface.

| Example No. | Test Temp., F.° | PSI | Tensile Strength Elongation % | Compression, inches at 30 lb | 60 lb | 90 lb | Failure Type % Cohesive | Adhesive |
| --- | --- | --- | --- | --- | --- | --- | --- | --- |
| 1 | 500 | 55 | 146 | 0.0138 | 0.0161 | 0.0173 | 10 | 90 |
|   | RT | 219 | 439 |   | ±0.018 |   | 10 | 90 |
| 2 | 500 | 53 | 233 | 0.0116 | 0.0143 | 0.0161 | 66 | 34 |
|   | RT | 261 | 476 |   | ±0.014 |   | 34 | 66 |
| 3 | 500 | 30 | 83 | 0.0127 | 0.0154 | 0.0173 | 66 | 34 |
|   | RT | 137 | 186 |   | ±0.015 |   | 75 | 25 |

Driven clutch discs were bonded with 32 adhesive beads which is approximately 22 square inches of adhesive per facing. A 1600 pound engaged load places a 73 psi load on the adhesive in these driven discs and there would be an 0.0184 inch compression. The hot shear strength at 500° F. was reported and, dynamometer tests provided a shear force of 624 pounds for a 235 foot-pound load and 797 pounds for a 300 foot-pound load. The compression and hot shear strength results are given in Table II.

TABLE II

| Specimen | Compression Modulus (PSI) | Hot Shear Strength at 500° F. (Pounds) |
| --- | --- | --- |
| 1 | 107 | 1210 |
| 2 | 124 | 1166 |
| 3 | 107 | 660 |

EXAMPLE 3 was found to be unacceptable in light of the dynamometer tests and the tensile strength results.

While three different bead patterns in FIGS. 1, 2 and 3 have been shown and a simple structure similar to a clutch disc and friction material lining has been shown in FIG. 4 to illustrate the present invention, it is manifest that these are in no way limiting, and are not to be interpreted as defining the scope of the invention described and claimed herein.

In evaluating the effect of the bead pattern or more generally the physical deformation characteristics of a rubber and its compounds particularly valuable parameters are volume reduction, shape factor and percent compression. A discussion and illustration of rubber and its compounds is available in "Engineering Uses of Rubber" edited by A. T. McPherson and Alexander Klimer, Reinhold Publishing Corporation, New York 1956. Particular reference is made to FIGS. 4.9 (page 75), 4.16 (page 82), and 4.18 (page 84), wherein volume reduction, shape factor and percent compression are illustrated, respectively, as a function of pressure (in atmospheres) or compression (in psi). The discussion in that text (ibid.) relates specifically to dry automobile clutches or driven-disc assemblies. FIGS. 4.9, 4.16 and 4.18 are illustrated herein as FIGS. 6, 7 and 8 respectively.

The clutch cushion springs previously referred to cause a more gradual clutch engagement than is attained with an uncushioned clutch, thereby providing a smoother clutch engagement or shift. These cushion springs are known to reduce lining wear, which wear increases rapidly as the cushion thickness decreases below 0.025 inch. The amount of cushion (implying spring compression) for a smooth clutch engagement varies with the particular clutch structure, but is known to range between 0.028 and 0.035 inch for automotive clutches with linings of an outer diameter between 7.75 and 11.0 inches. As these are generally clutches with two clutch facings or dry friction material elements, one-half of this compression, that is, 0.014 to 0.0175 inch, is attributable to each of these facings.

Figure 6:
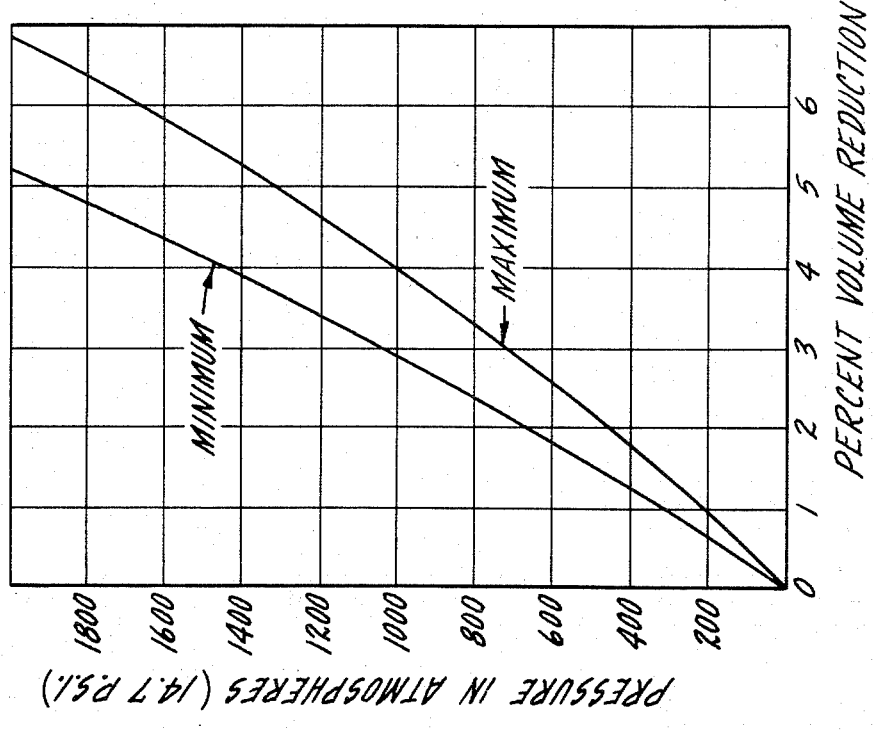
FIG. 6 is a graphical illustration of the percent volume reduction as a function of the pressure for natural rubber compounds.

FIG. 6 illustrates that it requires between 200 and 260 atmospheres pressure (i.e., 2,940 to 3,822 psi) to compress natural rubber 1% (one percent). The compression of rubber is associated with bulging at its sides and is correlated by a constant referred to as the shape factor S, which is the ratio between the area of the sides free to bulge to the area of a loaded surface, or for a rectangular piece $$S = \frac{ab}{2t(a + b)}$$

where ab is the loaded surface area and t is the thickness of the rectangular piece.

Figure 7:
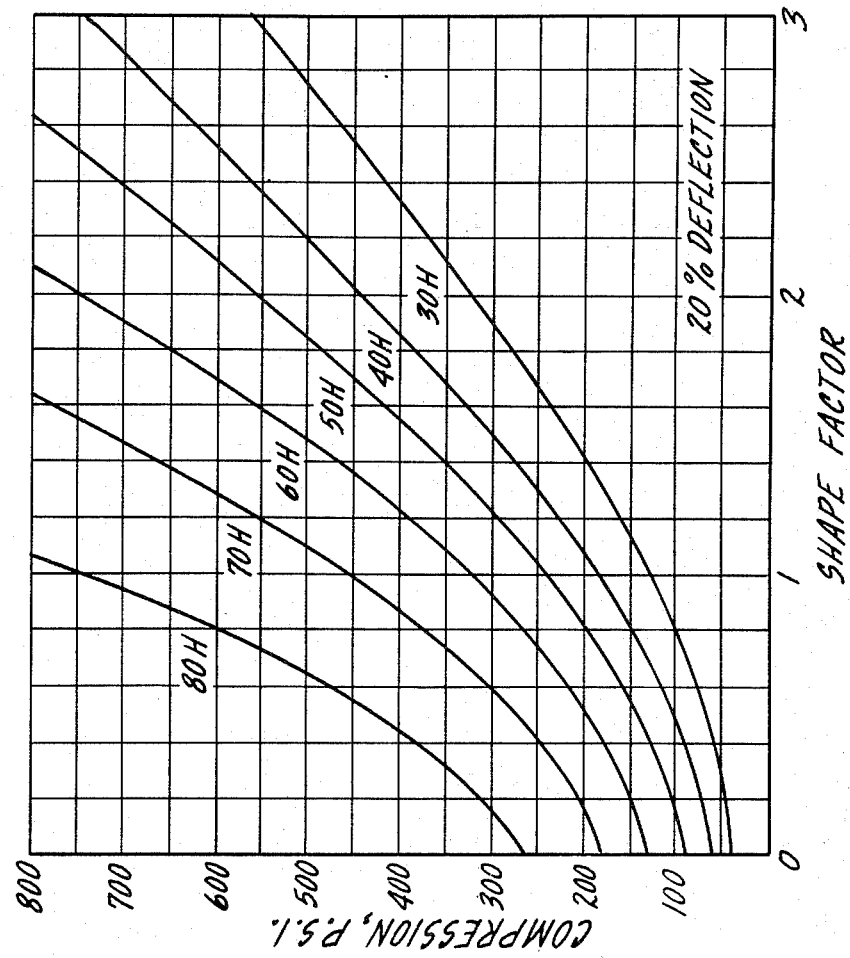
FIG. 7 is a graphical illustration of the shape factor as a function of the compressive force for a family of curves indicating varying hardness levels.

FIG. 7 illustrates the direct proportionality between shape factor and a given compression, that is, the larger the shape factor for a given piece the greater the pressure required for a given compression. FIG. 7 also shows the pressure required for a (20%) (twenty percent) compression of rubbers of increasing hardness between Shore 30 and 80, with a shape factor S up to 3.

Two eleven inch (11") outer diameter facings were bonded to a core plate by 24 circumferential RTV rubber segments each, which were between 2.38 and 3.50 inches long by 0.100 inch wide by 0.060 inch thick. These rubber segments had a shape factor of 0.80 and a hardness of Shore 30. At an engaged load of 1,570 pounds in a laboratory test these RTV rubber segments compressed about 0.020 inch, per facing, a total of 0.040" for a two lining assembly. In a test vehicle this driven disc assembly engaged smoothly.

In a similar test eleven inch (11") facings were bonded to a core plate with 32 radial segments each, 2.5 inches long by 0.25 inch wide by 0.060 inch thick. The shape factor of these segments was 1.89. At a laboratory test load of 1,570 lbs. the segments compressed 0.010 inch per facing or a total compression of 0.020 inch. In a test vehicle this clutch "chattered" at normal engagement, but by a technique of slow clutch pedal release at higher engine speeds smooth clutch engagement was possible.

Figure 8:
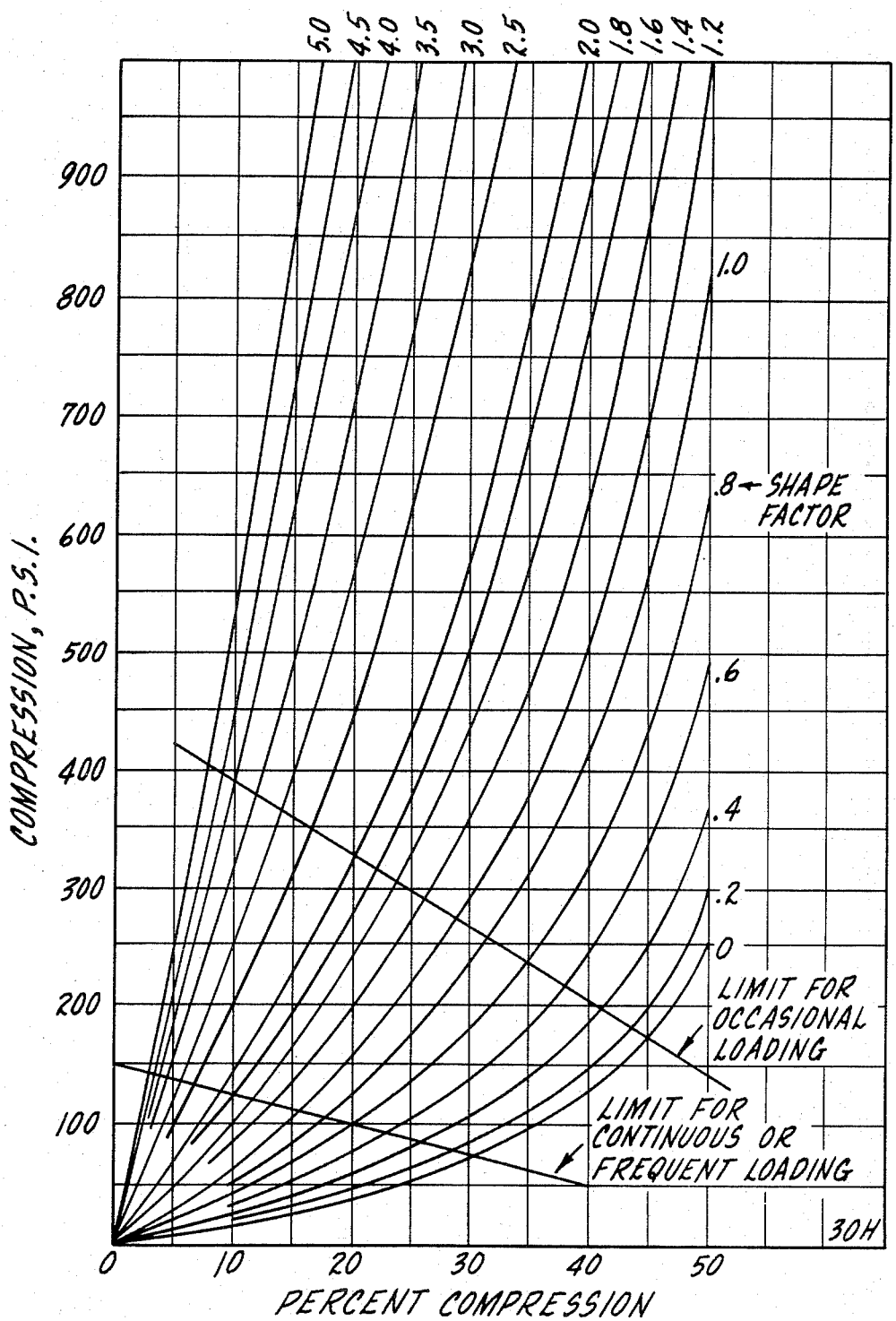
FIG. 8 is a graphical showing of a family of compression curves of varying shape factors for a rubber compound of 30 durometer hardness where the percentage of compression is a function of the compressive force.

A comparison calculation was performed for the prior art clutch shown in FIG. 1 of U.S. Pat. No. 2,253,316 with the following characteristics: an eleven inch (11") outer diameter lining size, with a rubber pad segment 1.77 inches by 2.16 inches, and having a rubber pad segment of 0.180 inch thick, where the shape factor S would be 2.71 for a soft rubber, that is a rubber hardness of Shore 30 (cf. FIGS. 7 and 8). As illustrated in FIGS. 7 and 8 a higher compressive force is required for samples with higher shape factors in for harder rubbers with the same shape factor, therefore, a soft rubber material was utilized for this analysis. Cushion compression of this clutch at an engaged load of 1,570 pounds would be under 3% (three percent) for rubber of a shape factor of 2.71, or about 0.0054 inch for a rubber pad 0.180 inch thick, which is significantly less than the 0.014 to 0.0175 inch compression of the conventional spring absorption clutch. In the examples above of a clutch with a bonded material only 0.060 inch thick, an 0.014 to 0.0175 inch compression would imply a compression between 23% (twenty-three percent) and 29% (twenty-nine percent) of such bonded material, which implies inadequate compression for smooth clutch engagement for the assembly described in U.S. Pat. No. 2,253,316.

Based on the above testing and analysis it is concluded that (1) the prior art clutch assembly structure would not provide the cushion effect of the present invention, and (2) the prior art clutch assembly would be expected to produce clutch engagement "chatter" or other adverse effects when used in a vehicle. The narrow bead and dot construction disclosed in the present application has more surface area available to bulge than the prior art structure. Therefore, the rubber beads and dots are able to compress significantly, at normal clutch engaging loads in the limited space available.

I claim:

1. A wearing dry friction material assembly comprising a substrate support member, a dry friction material element spaced at a predetermined distance from said substrate support member, and a plurality of cured rubber adhesive areas in a spaced pattern which form bridges between said friction element and said support member, said bridges after assembly remaining as a plurality of areas where the distance between the substrate member and the dry friction material is a function of the shear strength and compressibility characteristics of the rubber adhesive material, said bridges acting as a cushion between said dry friction material element and the support member when said dry friction material element engages a contacting surface.

2. A wearing dry friction material assembly as claimed in claim 1, wherein said adhesive is a room temperature vulcanizing type rubber adhesive.

3. A wearing dry friction material assembly as claimed in claim 1, wherein said cured adhesive areas have a shape factor less than 1.85.

4. A wearing dry friction material assembly as claimed in claim 1, wherein said spaced pattern of cured rubber adhesive areas provides an uniform support for said dry friction material element to maintain uniform loading on said dry friction material element at the time of engagement with contacting surfaces.

5. A dry friction material assembly comprising dry friction material lining or element mounted on a support member with the following steps:
   a. depositing beads or dots of a rubber adhesive on the support member or on the friction material element in a spaced pattern;
   b. positioning a fixture of given thickness between the support member and lining;
   c. positioning a dry friction material lining on the side of the fixture removed from the support member, so that the adhesive bridges the distance between the friction material lining and the support member;
   d. pressing the friction material lining and support member together against the fixture to form rubber adhesive bridges or elements of the desired thickness until the adhesive cures; and
   e. removing the fixture from between the support member and the dry friction material lining.

6. A dry friction material assembly as claimed in claim 5 wherein said cured adhesive bridges have a shape factor less than 1.85.

7. A dry friction material assembly as claimed in claim 5, wherein the adhesive is a room temperature vulcanizing (RTV) rubber-type adhesive.

* * * * *